K. WRIGHT.
PROCESS OF MANUFACTURING BATTERY PLATES.
APPLICATION FILED JULY 10, 1920.

1,381,387.

Patented June 14, 1921.
2 SHEETS—SHEET 1.

Inventor
KENNETH WRIGHT,
By Raymond A. Parker
Attorney

K. WRIGHT.
PROCESS OF MANUFACTURING BATTERY PLATES.
APPLICATION FILED JULY 10, 1920.
1,381,387.
Patented June 14, 1921.
2 SHEETS—SHEET 2.
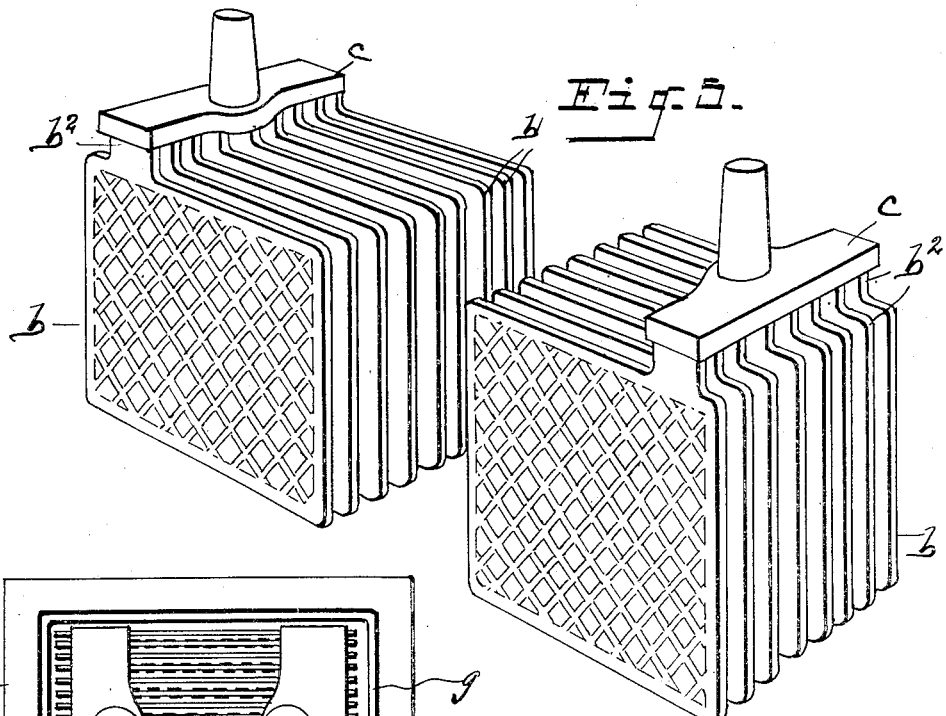
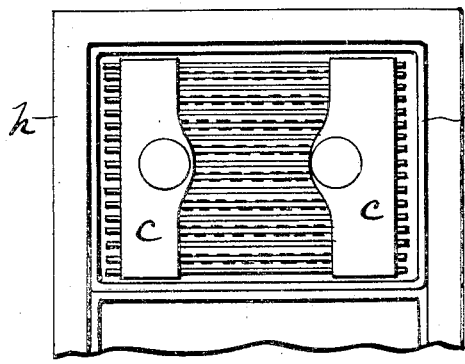
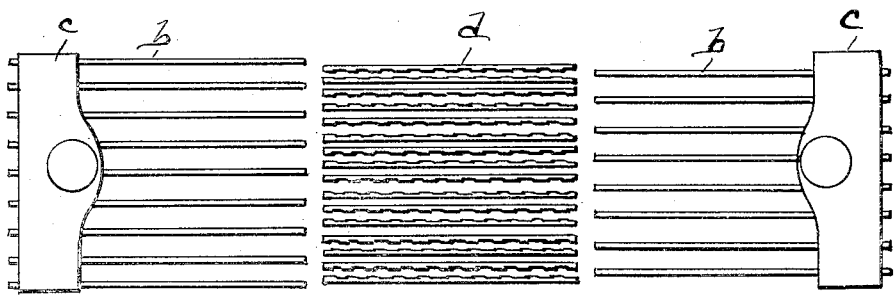
Inventor
KENNETH WRIGHT.
By Raymond A. Parker
Attorney

UNITED STATES PATENT OFFICE.

KENNETH WRIGHT, OF FLINT, MICHIGAN, ASSIGNOR OF ONE-HALF TO RUBEN H. WILLIAMS, OF FLINT, MICHIGAN.

PROCESS OF MANUFACTURING BATTERY-PLATES.

1,381,387.

Specification of Letters Patent. Patented June 14, 1921.

Application filed July 10, 1920. Serial No. 395,261.

*To all whom it may concern:*

Be it known that I, KENNETH WRIGHT, citizen of the United States, residing at Flint, county of Genesee, State of Michigan, have invented a certain new and useful Improvement in Processes of Manufacturing Battery-Plates, and declare the following to be a full, clear, and exact description of the same, such as will enable others skilled in the art to which it pertains to make and use the same, reference being had to the accompanying drawings, which form a part of this specification.

My invention relates to an improved method of manufacturing or forming battery plates and consists in forming a negative electrode in the forming tank, forming negative plates through the use of dummy positives and then by using such formed negatives in both the negative and positive positions in the battery, upon the passing of an electric current therethrough, forming a positive electrode, the negative electrode remaining negative.

By this process it is possible to do away with the use of forming agents used to cement the particles of a plate together. A more perfectly built-up plate is produced, the particles of which are more securely cemented together and which is capable of delivering greater current and is of longer life and able to take a greater charge than is possible with the present standard practice.

In the drawings—

Fig. 5 is a perspective showing the negative and positive electrodes of the battery withdrawn from one another.

Fig. 6 is a plan view showing the negative and positive electrodes of the battery separated from each other with separator strips positioned between such units before they have been assembled.

Fig. 7 is a plan view showing the two electrodes assembled as in a battery jar with the intervening separator strips in position.

The commercial manufacture of battery plates is, as to certain general practices, fairly standardized. To a degree I follow the general routine and it is thought that it will be helpful briefly to set forth such practice, then distinguish the way in which my method of manufacture differs therefrom so as to clearly show what I deem to be my invention in the art.

In the manufacture of battery plates today, a pasted plate is the basis on which the operation starts. These pasted plates comprise a casting commonly termed a "grid" composed of lead with a small percentage, perhaps 8 to 10%, of antimony, which grid is used as the skeleton framework on which to hang the "active" substance, such as litharge.

In present day manufacture, these active substances vary in the positive and negative plates. A standard paste used for the positive plate is litharge (PbO) or red lead ($Pb_3O_4$) or a combination of the two mixed into a paste by the use of sulfuric acid diluted with water. Litharge alone so mixed into such a paste might be considered a standard paste for the negative plate. These pastes are worked into the interstices of the plate either by hand or by the use of machinery and the plates are then allowed to harden and they form what is termed a pasted plate. Certain forming agents are frequently used in the paste, such as sugar and magnesium sulfate, etc. These forming agents are to increase the hardness of the plates or the porosity or for other reasons. They, however, form no part of my process.

The pasted plates, negatives and positives, which for the sake of differentiating them from the completed or formed plates after they have gone through a forming tank will be referred to herein as "unformed" plates, are now placed in a standard forming tank, immersed in an electrolyte, a common one would be sulfuric acid ($H_2SO_4$) the specific gravity of which is about 1.300. They are arranged similarly to their arrangement in a battery, that is positives and negatives alternating, the positive plates connected together and the negative plates connected together separated from each other and supported from the bottom of the tank. An electric current is then passed through for from three to seven days, positive plates under its influence changing to lead peroxid with a small percentage of litharge and lead sulfate and turning to a chocolate brown color, and the negative plates changing to spongy or pure metallic lead with a small percentage of litharge and assuming a slate gray color. This process is called "forming" the plates. The paste as originally applied to the grids could not enter into chemical actions with the electrolyte so as to provide electricity, but must first be changed by the use of an electric current before becoming active material and this change takes place in the forming process in the tank.

Figure 1:
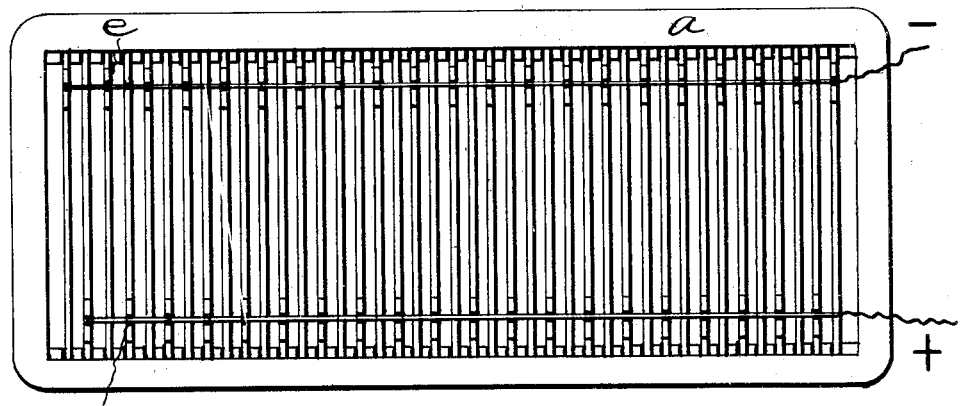
Figure 1 is a plan view showing the series of plates positioned in the forming tank.
Figure 2:
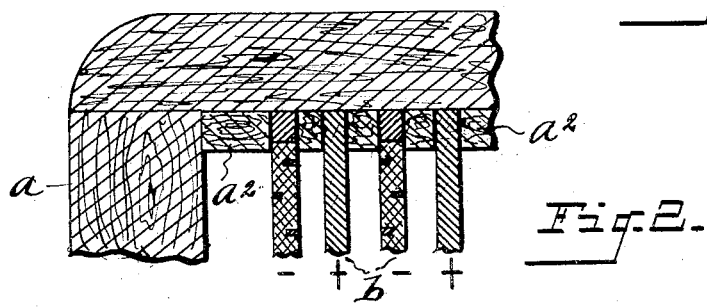
Fig. 2 shows an enlarged section of a forming tank.
Figure 3:
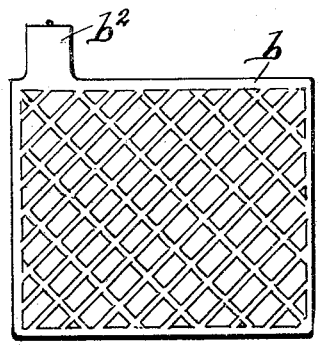
Fig. 3 is an elevation of one of the metal ribs.
Figure 4:
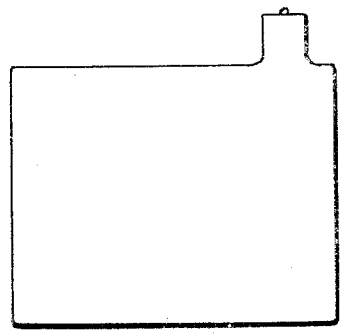
Fig. 4 is an elevation of a lead dummy plate.

I use a similar forming tank indicated as $a$ provided with strips, not shown in the drawing, extending longitudinally along the bottom thereof to support the plates therefrom. I provide an acid bath having a specific gravity of about 1.150 in which the plates are immersed. I do not, however, make up positive and negative plates. I make merely negative plates in the forming tank. My negative plate comprises a grid $b$ provided with the conventional lugs $b^2$ at one end, which are adapted to be secured to a connecting strip $c$ as shown in Fig. 5. On this skeleton framework I affix a paste formed of red lead, a preferred combination being 80% red lead and 20% litharge mixed into a paste by the use of diluted sulfuric acid and applied to the plates as described, forming a pasted unformed plate. These negative plates of a brick red color are connected together to form a negative electrode in the forming tank, as shown in Fig. 1 at $e$ and separated from each other and from the positive dummies by side strips $a^2$, as shown in Fig. 2.

In place of the positive pasted plates previously described I provide dummy metallic lead blanks or plates connected together to form a positive electrode. These dummies are simply metallic lead plates connected together in the forming tank as at $f$ and used in the positive position. An electric current is now passed through the plates and the negative pasted plates change to pure metallic lead with perhaps a small percentage of litharge and turn to a slate gray color.

Whatever change takes place in the positive makes no difference as they are intended for use over again and are merely to be used in the forming tank.

By the use of these lead dummies a heavier current may be sent through, as the electric current is cementing or sulfating the negative plates and whatever breaking down effect this current may have on the lead dummies is of no consequence. Because all my plates are made in the negative position the active substance is cemented or sulfated to form a compact, hardened plate of a substantially serviceable character. It is not necessary, therefore, to use any of the many kinds of forming agents such as magnesium sulfate to cement the particles of the plates together. These forming agents as a rule have a harmful effect upon the plate. Furthermore in the manufacture of plates as practised today there is a great loss of the positives in the forming tank. These are broken down and ruined due to the action of the electrical current. By not using the pasted plates in the positive position there is no such loss in my process of manufacture and my negative plates are of superior character.

When the forming process is completed, the negatives are withdrawn from the tank and assembled into units of eight or nine or such number as may be desired, as shown in Figs. 5 and 6, the lug $b^2$ carried at one end thereof being fused into a connecting strap $c$ as shown in Fig. 5. This forms a unit adapted to serve as one electrode in a battery and is similar to the present practice of assembly. Two of these assembled units are then immersed in the electrolyte carried in the battery jar, as shown in Fig. 6, where the rubber jar is indicated by letter $g$ and battery box by $h$. Suitable separators $d$ are provided between the plates which of course is conventional practice. One unit is connected to form the positive electrode and the other the negative electrode.

It will be observed, therefore, that in the battery as just described I have used the negative plates taken from the forming tank in both the positive and negative electrodes. The electric current is now passed through the battery and as the charging current passes through the battery plates carried by the unit which forms the positive electrode they change to positive plates, turning to a chocolate brown color and changing from pure metallic lead to lead peroxid. The plates forming the negative electrode remain spongy lead. Upon the completion of this charging operation the battery is complete, it of course being understood that the further assembly will be completed, such as securing a cover plate to a jar and providing the battery box.

It may prove desirable to vary the specific gravity of the electrolyte in the battery jar after the forming process has been completed by increasing the amount of the acid.

What I claim is:

1. The method of forming battery plates which consists in using at the negative pole in a forming tank a series of pasted plates connected together and at the positive pole a series of dummy lead blanks connected together, passing an electric current therethrough for such time as is necessary to form such negative plates.

2. The method of forming battery plates which consists in immersing in a forming tank containing sulfuric acid at about 1.150 specific gravity a series of pasted plates connected together and a series of metallic lead plates connected together, such pasted plates alternating with said lead plates but spaced apart therefrom, passing an electric current through said lead plates, sulfuric acid, and through said pasted plates until such pasted plates have changed to substantially pure metallic lead.

3. A method of forming battery plates which consists in immersing in an electrolyte in a forming tank a series of pasted metallic grids upon which a paste composed largely of red lead has been applied, connecting such pasted plates together to form the negative electrode, connecting together a series of metallic lead blanks to form the positive electrode, alternating the same with the pasted plates and spacing them from each other in the usual manner adopted in the forming tank, passing an electric current therethrough at such rate, strength, etc., as may be most desirable until the pasted plate has changed to substantially pure metallic lead and chemical action within the negative plates has practically ceased.

4. The method of forming battery plates which consists in applying to a metallic grid a paste composed of red lead with a considerably less quantity of litharge mixed to form a paste by the use of dilute sulfuric acid, connecting a series of such plates together to form the negative electrode in the tank, immersing the same in a forming tank containing dilute sulfuric acid, connecting together a series of metallic lead plates to form the positive electrode, alternating said lead plates with said pasted plates and spaced therefrom, passing an electric current through said lead plates, electrolyte and negative plates for such time as may be necessary to change the negative plates to spongy lead.

5. A method of forming battery plates which consists in providing a pasted plate formed on a skeleton framework of metallic lead, the paste being composed largely of red lead, connecting such pasted plates together and immersing the same in a dilute $H_2SO_4$ electrolyte in a forming tank, connecting together a series of metallic lead blanks and immersing the same in said electrolyte so that the lead blanks alternate with the pasted plates but are spaced therefrom, using the lead blanks as the positive electrode and the pasted plates as the negative electrode in such forming tank, passing an electric current therethrough until chemical action within the pasted plates has practically ceased, removing such formed negative plates from the tank and connecting together a series to form the positive electrode, positioning the same in a battery jar immersed in an electrolyte therein contained, connecting together a second series to form the negative electrode, positioning the same in the battery jar after the usual fashion, passing a charging current therethrough until the plates carried at the positive pole have changed to positive plates.

6. The method of forming battery plates which consists in forming at the negative electrode in the forming tank pasted plates of substantially pure metallic lead through the use of dummy lead blanks at the positive electrode, removing such formed metal lead negatives, connecting the same together to form positive and negative electrodes for a battery, immersing the same in the electrolyte in a battery jar properly separated from each other, passing an electric current therethrough until the plates carried at the positive pole become positive and have changed substantially to lead peroxid.

In testimony whereof, I sign this specification.

KENNETH WRIGHT.